United States Patent
Aarseth et al.

(10) Patent No.: US 8,232,907 B2
(45) Date of Patent: Jul. 31, 2012

(54) STEP FREQUENCY HIGH RESOLUTION RADAR

(75) Inventors: Craig Aarseth, Massapequa, NY (US); Robert Wahl, Kings Park, NY (US)

(73) Assignee: Telephonics Corporation

( * ) Notice: Subject to any disclaimer, the term of this patent is extended or adjusted under 35 U.S.C. 154(b) by 0 days.

(21) Appl. No.: 11/209,336

(22) Filed: Aug. 23, 2005

(65) Prior Publication Data

US 2007/0285302 A1    Dec. 13, 2007

Related U.S. Application Data

(60) Provisional application No. 60/603,742, filed on Aug. 23, 2004.

(51) Int. Cl.
*G01S 13/06* (2006.01)
*G01S 13/90* (2006.01)

(52) U.S. Cl. ........... 342/25 R; 342/132; 342/196

(58) Field of Classification Search ........... 342/25 R
See application file for complete search history.

(56) References Cited

U.S. PATENT DOCUMENTS

| | | | | |
|---|---|---|---|---|
| 5,128,681 A | * | 7/1992 | McGroary et al. | 342/132 |
| 5,309,160 A | * | 5/1994 | Powell et al. | 342/128 |
| 5,428,361 A | * | 6/1995 | Hightower et al. | 342/201 |
| 5,923,280 A | * | 7/1999 | Farmer | 342/70 |
| 6,087,981 A | * | 7/2000 | Normant et al. | 342/134 |
| 6,531,976 B1 | * | 3/2003 | Yu | 342/16 |
| 6,750,809 B1 | * | 6/2004 | Cho et al. | 342/129 |
| 6,965,341 B1 | * | 11/2005 | Cho et al. | 342/25 A |
| 2005/0179585 A1 | * | 8/2005 | Walker et al. | 342/134 |

OTHER PUBLICATIONS

Lord et al. "High Range Resolution Radar Using Narrowband Linear Chirps Offset in Frequency". Proceedings of the 1997 South African Symposium on Communications ad Signal Processing. Sep. 9-10, 1007. pp. 9-12.*

Lord et al. "High Resolution SAR Processing Using Stepped Frequencies". Geoscience and Remote Sensing. vol. 1. Aug. 3-8, 1997. pp. 490-492.*

McGroary et al. "A Stepped Chirp Technique for Range Resolution Enhancement". National Telesystems Conference. Mar. 26-27, 1991. pp. 121-126.*

* cited by examiner

*Primary Examiner* — John B Sotomayor
*Assistant Examiner* — Matthew M Barker
(74) *Attorney, Agent, or Firm* — Thomas A. O'Rourke; Bodner & O'Rourke, LLP

(57) ABSTRACT

The present invention is directed to an improved radar system that produces high range resolution while using existing narrow processing bandwidths and sampling rates to achieve a low cost radar product that is particularly useful for moving targets. The present invention uses a small number of closely spaced Linear Frequency Modulated Chirps. In one embodiment typically 2, 3, 4 chirps are used. Each frequency is sampled at a rate commensurate with the narrower bandwidth, corrected for motion, Time Aligned and combined to produce a single wide-band chirp but achieved using the lower sample rate commensurate with the narrower transmitted waveform.

17 Claims, 11 Drawing Sheets

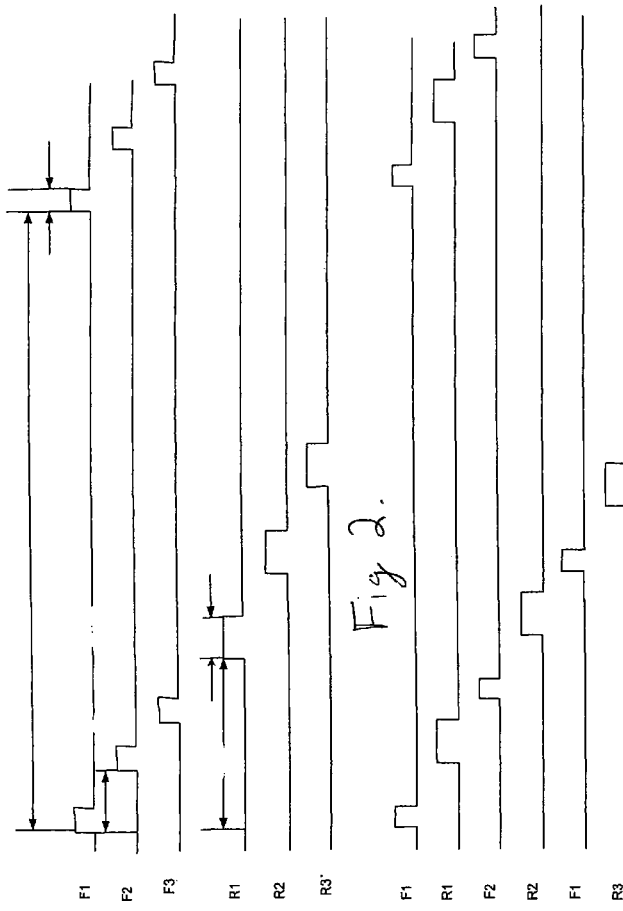
Fig. 1
Fig. 2
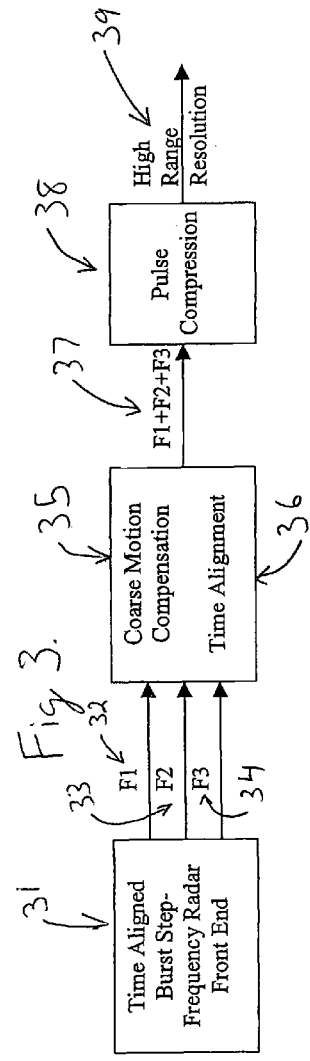
Fig. 3

Unwrapped Phase of RF

Linear Weighting of match filtered RF blend

STEP FREQUENCY HIGH RESOLUTION RADAR

This is a conversion of U.S. Provisional Application Ser. No. 60/603,742, filed Aug. 23, 2004, the disclosures of which are incorporated herein by reference.

FIELD OF THE INVENTION

The present invention relates to improvements in coherent high range resolution imaging applications including but not limited to Strip Map, Spot SAR and ISAR.

BACKGROUND OF THE INVENTION

In many radar applications it is necessary to form two-dimensional images of targets such as ground vehicles, aircraft, ships, and so forth. Resolution in one dimension is provided by the range resolution inherent in the transmit waveform, and resolution in the other cross range dimension is provided by Doppler resolution. The principles are widely applicable and widely applied. Synthetic aperture radar (SAR) forms two-dimensional images in range and cross range with the cross range dimension utilizing the motion of the platform for Doppler resolution. Inverse synthetic aperture radar (ISAR) is accomplishing the same objective with the cross range dimension utilizing the motion of the target being imaged. In other applications the same principle of Doppler resolution is used, even though no specific name has been given to the process. The very same principles also if, instead of forming images, the processor uses range and Doppler resolution to resolve specific scatterers on the target, and then measures the separation of these scatterers in order to obtain target dimensions. All these multi-dimensional imaging techniques require high range resolution (HRR).

Range resolution ($\Delta r_s$) is directly related to bandwidth:

$$\Delta r_s = c/(2*B)$$

where c is the speed of light and B is the bandwith or frequency excursion of the transmit signal. Modem sub foot imaging systems must therefore transmit and receive an equivalent bandwidth of greater than 600 Mhz. Six inch resolution requires greater than 1.2 Ghz of equivalent bandwidth. The transmitter must be capable of generating this wideband signal and transmitting it without distortion. On receive, the wideband signal must be downconverted and sampled at or above Nyquist for processing. For the six inch case, Nyquist at baseband is 1.2 Ghz. Direct methods exist that operate with the instantaneous bandwidth being the resolution bandwidth. Two direct waveforms are currently used in obtaining high resolution 1) Direct Short Pulse and 2) Chirped Pulse Compression.

In direct short pulse systems the time bandwidth product of a rectangular pulse is ~1.

$$B\tau \sim 1$$

where $\tau$ is the pulsewidth. The range resolution of a direct short pulse is therefore:

$$\Delta r_s = (c*\tau)/2$$

High range resolution using short pulses is possible with both noncoherent and coherent radars. Magnetron transmitters in noncoherent radars can be turned on and off rapidly enough to generate pulses with a minimum pulsewidth of ~50 nanoseconds. This has a corresponding range resolution of 24.6 ft. Peak and average power capabilities of a magnetron based system is capable of providing performance at longer ranges however without the resolution. To achieve a range resolution of 1 foot and six inches requires a pulsewidth of ~2 and 1 nanoseconds respectively. Impulse generators have been used to generate these extremely small pulsewidths. These small pulsewidth can be applied to a High Power Amplifier such as a Traveling Wave Tube Amplifier (TWTA), however even with the higher peak power, the average powers achievable limits the long range performance. For this reason the sub foot direct pulse configurations have been primarily used in Radar Cross Section diagnosis's configurations.

Chirped pulse compression allows a radar system to transmit a pulse of relatively long duration pulse (microseconds) at a higher peak power pulse to simultaneously attain the range resolution of a short pulse and the high average power of a long pulse transmitter. Fine range resolution is achieved in pulse compression systems by coding the RF carrier of the long pulse to increase the bandwidth of the transmit signal. When the reflected signal is received, the coded waveform is applied to a matched filter that compresses the transmitted pulse. Most airborne radars use linear Frequency Modulation (LFM) where the frequency of the transmit signal varies linearly with time. For example, the transmit frequency of one radar varies by 185 MHz over a 40 microsecond pulse. The receiver collects reflected pulses, which are 3.25 nm long and compresses them into an effective pulse width that is 5.4 nanoseconds. This corresponds to a resolution of 0.8 m. The 10 kilowatt peak power transmitter of the transmitter provides an average power of 200 watts on targets out to 160 nm. If a magnetron-based radar system could transmit a 5.4 nanosecond pulse, it would have to output 74 MW of power to achieve the same average power on target. It would not be practical to fly such a transmitter on a aircraft because of the larger size, prime power consumption and cooling apparatus. As a result of pulse compression, the 25 foot resolutions achieved with magnetron systems have been reduced to less than 1 m. Chirped pulse compression systems can achieve sub foot resolutions by transmitting and receiving the necessary bandwidth in the coded waveform. However, as mentioned previously, the transmit and receive hardware must support the instantaneous bandwidth. At X-Band the ratio of bandwidth to carrier frequency to achieve sub foot resolution is >10%. This pushes the hardware up against technology constraints and results in an expensive and complex radar system.

Stretch processing of linear FM pulses originally developed by W. Caputi, reduced the complexity on the receiver side of the radar. The stretch concept provides HRR by transmitting a linear FM pulse of the necessary bandwidth just like a chirped pulse compression system. On receive the returns are down-converted in frequency with a frequency modulated Local Oscillator signal of identical FM slope as the transmit signal. The corresponding down-converted signals are fixed frequency pulses, the center frequency of the pulse depends upon the relative range of the range gated scene. The IF signals are sampled and converted to the frequency domain providing a range profile of the scene. This technique does reduce the complexity of the receive path however the transmit path remains complex and the technique is not extendable to larger range swaths.

To bypass the complexity, cost and technological limitations of achieving subfoot high range resolution with transmit signals containing the necessary instantaneous bandwidth, engineers have developed a technique to synthesize the HRR using multiple narrower band signals of different frequencies. This technique, known as the stepped frequency waveform (SFW) consists of a sequence of pulses transmitted with fixed uniform pulse to pulse frequency change ($\Delta F$). The number of pulses (N) required is a function of the desired resolution and the pulse to pulse frequency change (ΔF).

$$\Delta r_s = c/(2*N*\Delta F)$$

The SFW process is not a single look process like the direct methods described above. It requires the transmission and reception of multiple pulses. The total time to transmit the necessary pulses to synthesize the HRR waveform is simply the radar PRI times the number of pulses. Along with the simplicity of the technique there are many limitations that limit its usefulness. Conventional Step Frequency processing does not handle moving targets either actual motion or motion due to scene rotation about a fixed point in a Spot SAR or ISAR image. It requires a large number of individual frequencies to permit acceptable sample weighting to achieve low range sidelobes after the DFT. The coarse range samples are unmodulated pulses. The large number of frequencies required may mean that there are insufficient samples to permit target Doppler Frequency measurement and there may be a multitude of adjacent channel self-jamming situations. DFT/FFT processing requires a constant time step between transmissions. This will exacerbate any target motion

SUMMARY OF THE INVENTION

The present invention produces high range resolution while using existing narrow processing bandwidths and sampling rates to achieve a low cost radar product that is particularly useful for moving targets. The present invention uses a small number of closely spaced Linear Frequency Modulated Chirps. In a preferred embodiment typically 2, 3, 4 or more chirps are used. Each frequency is sampled at a rate commensurate with the narrower bandwidth, corrected for motion (Time Aligned) and combined to produce a single wide-band chirp but achieved using the lower sample rate commensurate with the narrower transmitted waveform. For a moving Radar platform the samples themselves are also corrected for platform motion. Following combination, the new wide band waveform is pulse compressed in the conventional manner. The method allows the individual frequencies to be transmitted with arbitrary time separation. By transmitting the pulses with small time separation there are fewer target motion effects and more accurate corrections.

DESCRIPTION OF THE FIGURES

FIG. 1 is an example of a long range case Time Aligned Burst Step (TABS) Frequency.
FIG. 2 is an example of a short range case TABS Frequency
FIG. 3 is a conceptual signal flow of the present invention.

DETAILED DESCRIPTION OF THE INVENTION

In the present invention a transmitter is employed to broadcast a frequency-modulated probe signal at each of a number of frequency steps. A receiver receives a return signal from which magnitude and phase information corresponding to a target object are measured and stored in a memory at each of the center frequency steps. The range to the object is determined using the set of magnitude and phase information stored in the memory. The present invention uses a number of narrow bandwidth pulses instead of a large broad band pulse to determine the location of a target.

FIG. 1 illustrates the present invention being used to locate a target at a long range. The pulses F1, F2, and F3 represent a series of pulses emitted by a radar system utilizing the present invention. The pulses R1, R2, and R3 represent the pulses returning to the detector after bouncing off the target. All the F pulses in the initial emission are transmitted in a series of short bursts before any of the R pulses have returned from the target. The number of F pulses in each emission can vary in the period. The greater the number of chirps that are transmitted before the R pulses return, the less target motion effects that are present. The transmission of the F pulses prior to return of the R pulses produces high range resolution while using narrow processing bandwidths. The F pulses are preferably closely spaced Linear Frequency Modulated Chirps. In one embodiment of the present invention, each frequency is sampled at a rate commensurate with the narrow bandwidth, time aligned, corrected for motion—by applying a phase ramp to shift the frequency grid of neighboring swaths (see FIG. 4 and FIG. 5), and combined to produce a single wide band chirp but obtained from the lower sample rate commensurate with the narrower transmitted waveform.

FIG. 2 illustrates the present invention being used to locate a target at a short range. The pulses F1, F2, and F3 represent a series of pulses emitted by a radar system employing the present invention. The pulses R1, R2, and R3, represent the pulses returning to the detector after bouncing off the target. Notice that the corresponding R pulse for each F pulse has bounced off the target and returned to the detector before the next F pulse is sent.

FIG. 3 illustrates a block diagram of one embodiment of the present invention. The Time Aligned Burst Step-Frequency Radar Front End, 31 transmits, for example, 3 signals designated as, F1 (32), F2 (33), and F3 (34). Signal F1 (32) and F2 (33) are sent to the Coarse Motion Compensation 35, while F3 (34) is sent to Time Alignment 36. The three signals are then combined to form a single signal 37 and sent to Pulse Compression 38. Pulse Compression creates the final High Range Resolution Signal 39.

Figure 4:
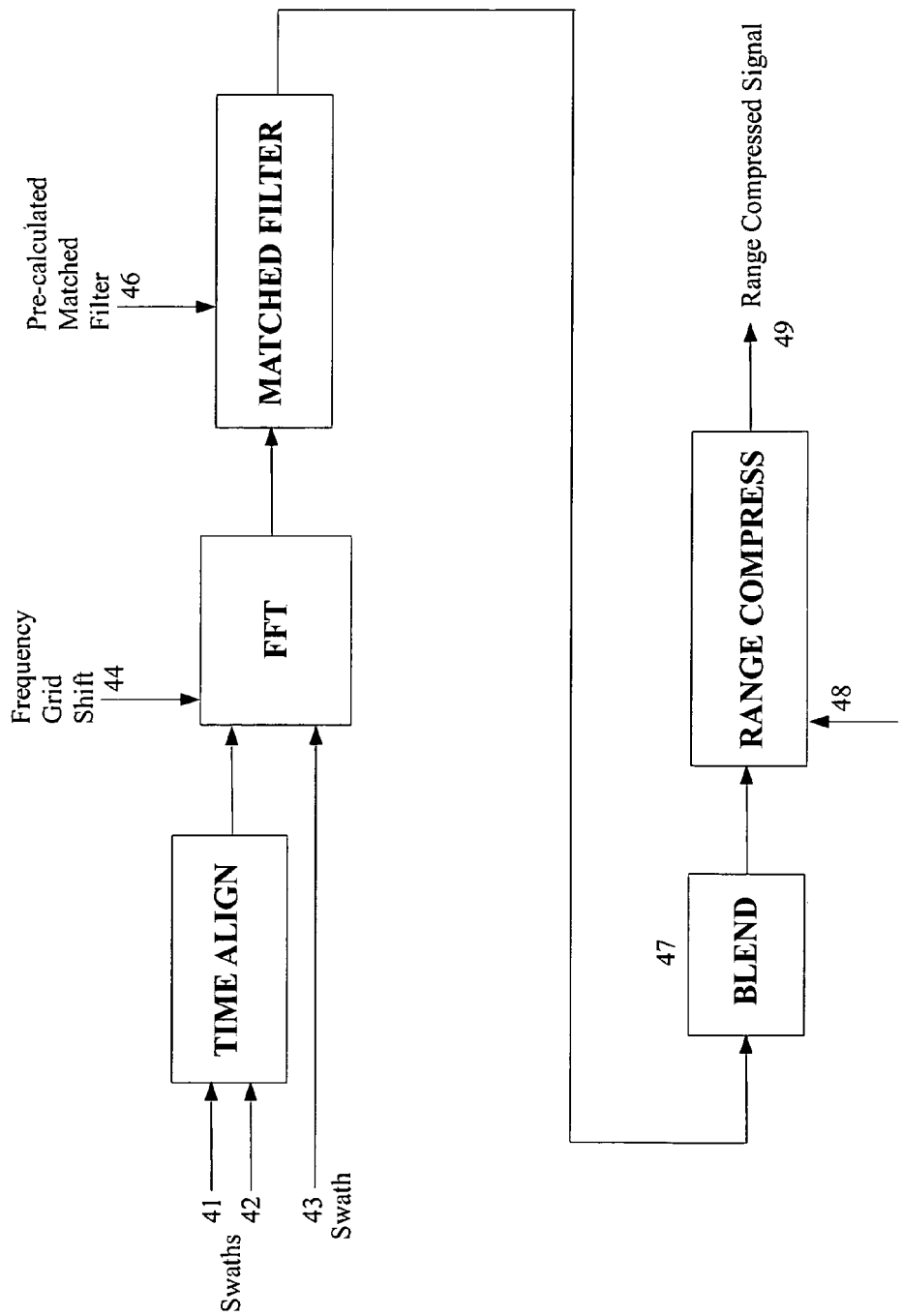
FIG. 4 is a block diagram of the step frequency processing.

FIG. 4 illustrates a block diagram of another embodiment of the present invention. The two swaths, 41 and 42, are sent to the Time Align. The time aligned signal is then sent to a frequency grid shift 44 where a third swath 43 is convolved with the time aligned signal. The Frequency Grid shift signal is then sent to the Pre-calculated matched filter 46. The signal from the Matched Filter 46 is then sent to the Blend 47 and is finally sent to the Range Compress 48. The Range Compressed signal 49 is the final product.

Figure 5:
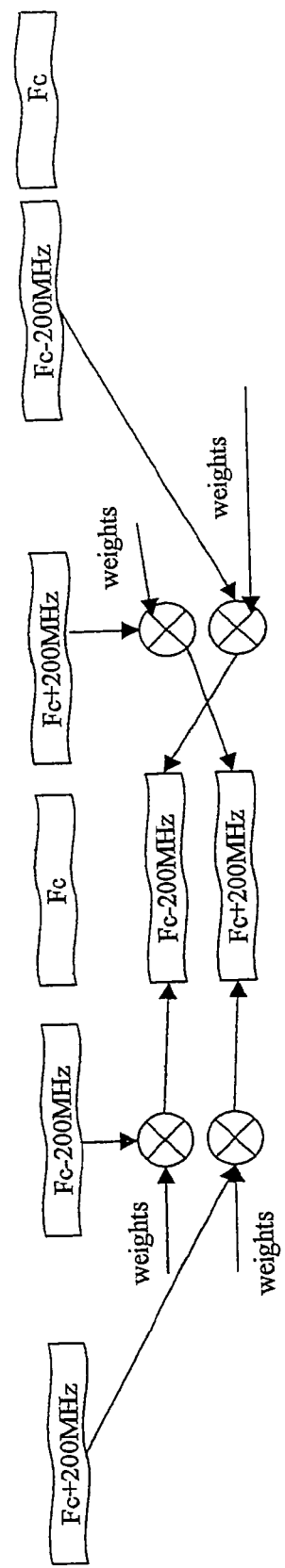
FIG. 5 is a block diagram of the time alignment

FIG. 5 illustrates a block diagram showing the internal workings of the Time Align 45 block in FIG. 4. If pulse trains of different frequencies are transmitted at different times, the target may move appreciably in phase during this time. This effect can be minimized if the system interpolates the pulses in slow time back to the pulse time center frequency. The resolution is assisted by the fact that the delays can be minimized, approximately 75 microsec. This linear interpolation is sufficient.

Figure 6:
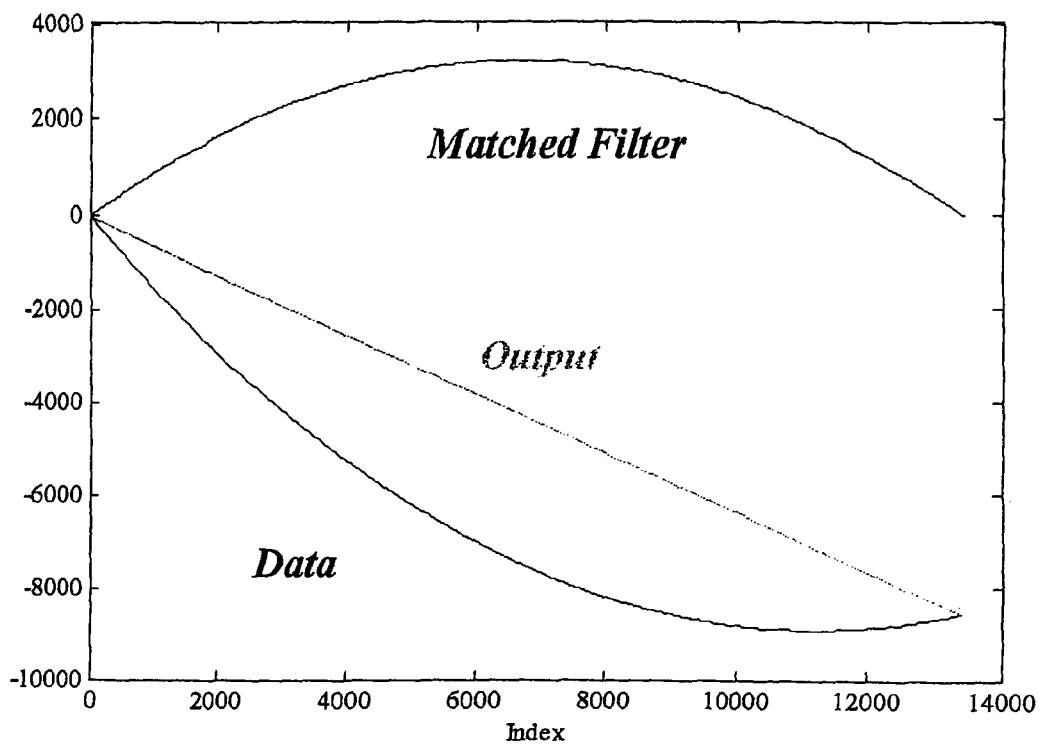
FIG. 6 is a signal plot of the matched filter

FIG. 6 illustrates the Matched filter 46 in FIG. 4. FIG. 6 is precalculated as the conjugate 16K:FFT of an idealized chirp (205 MHz BW20 microsec pulse width). This is applied individually to each swath. The swath is Fourier interpolated to correct the frequency grid by applying a phase ramp to the time chirp. The output for point targets should be linear ramp matching its neighboring swaths.

Figure 7:
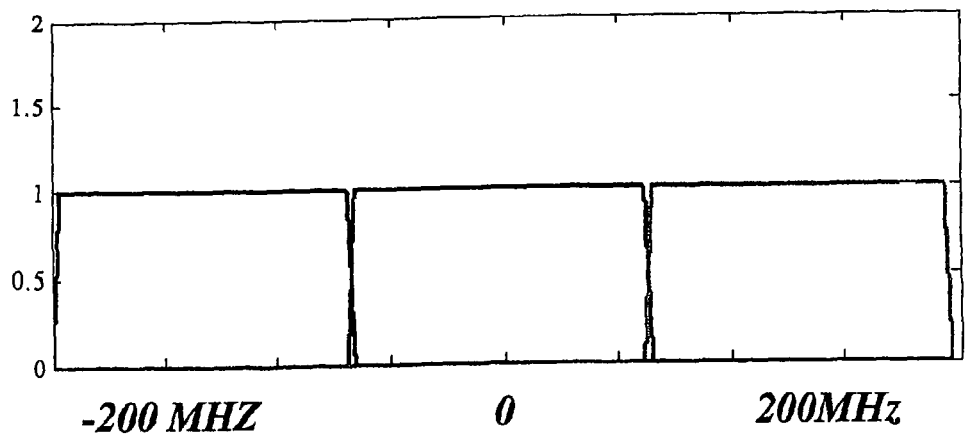
FIG. 7 is a graph of the matched filtered frequencies blended/concatenated with a 5 MHz overlap

FIG. 7 illustrates the Blend 47 block in FIG. 4. The Match Filtered frequencies are blended/concatenated with a 5 MHz overlap. There is linear weighting for a coherent sum.

Figure 8:
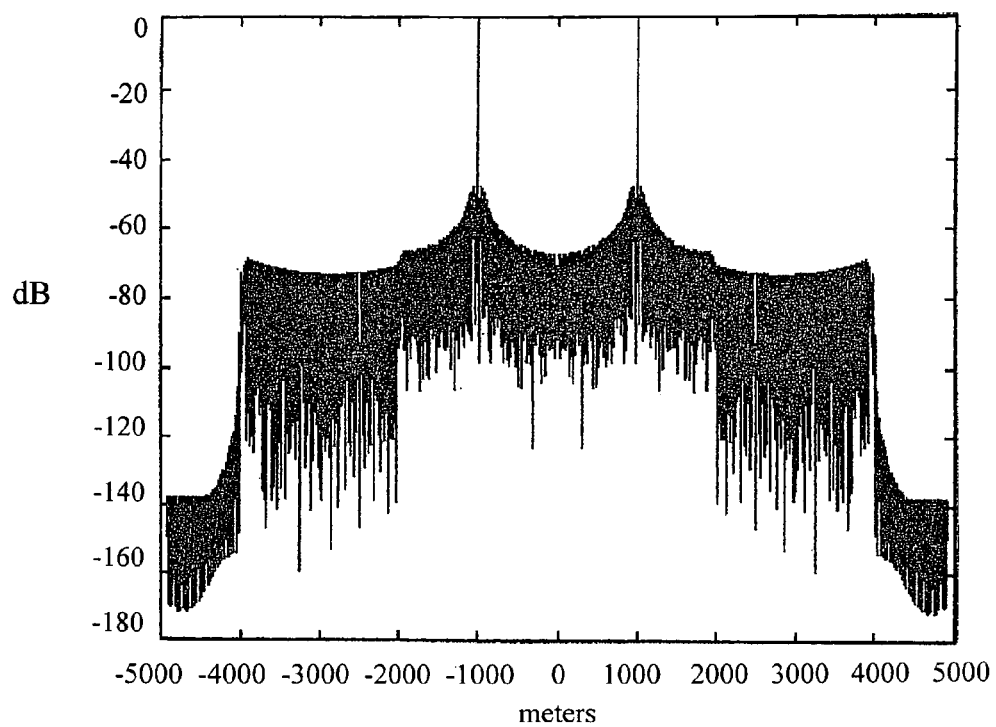
FIG. 8 shows a graph of the range compress

FIG. 8 illustrates a wave form of the Range Compress 48 block shown in FIG. 4. Pad for 65 k IFFT, Hamming window for side lobe reduction. The final output is 15 meter sampling, 0.25 meter resolution two target case at −1000 meters and 1000 meters.

It is assumed that the hamming window is 31% wider than sinc, to achieve 1 ft resolution Bw=645 Mhz. The predicted resolution for 605 MHz is 0.32 m. The firing sequence time offsets has no effect on stationary targets, and superposition of targets hold.

Figure 9:
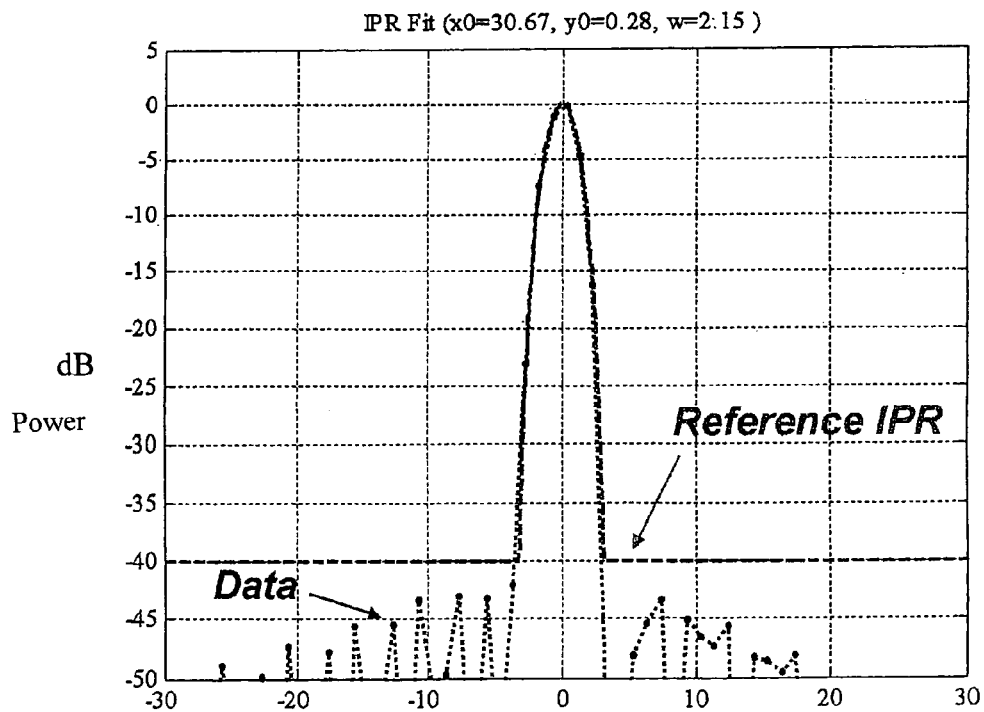
FIG. 9 shows the Chi-Square fit to Reference IPR
Figure 10:
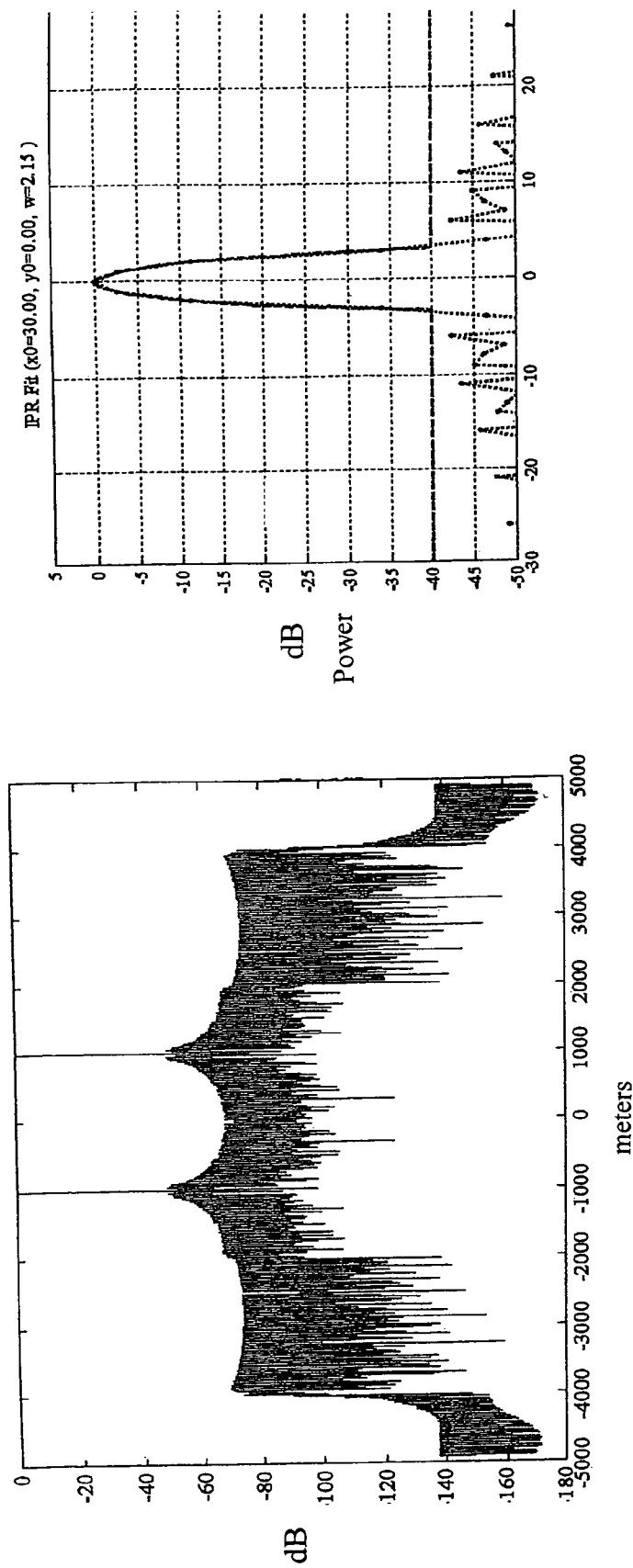
FIG. 10 illustrates one example of the invention: 2×0 m/s, TA disabled
Figure 11:
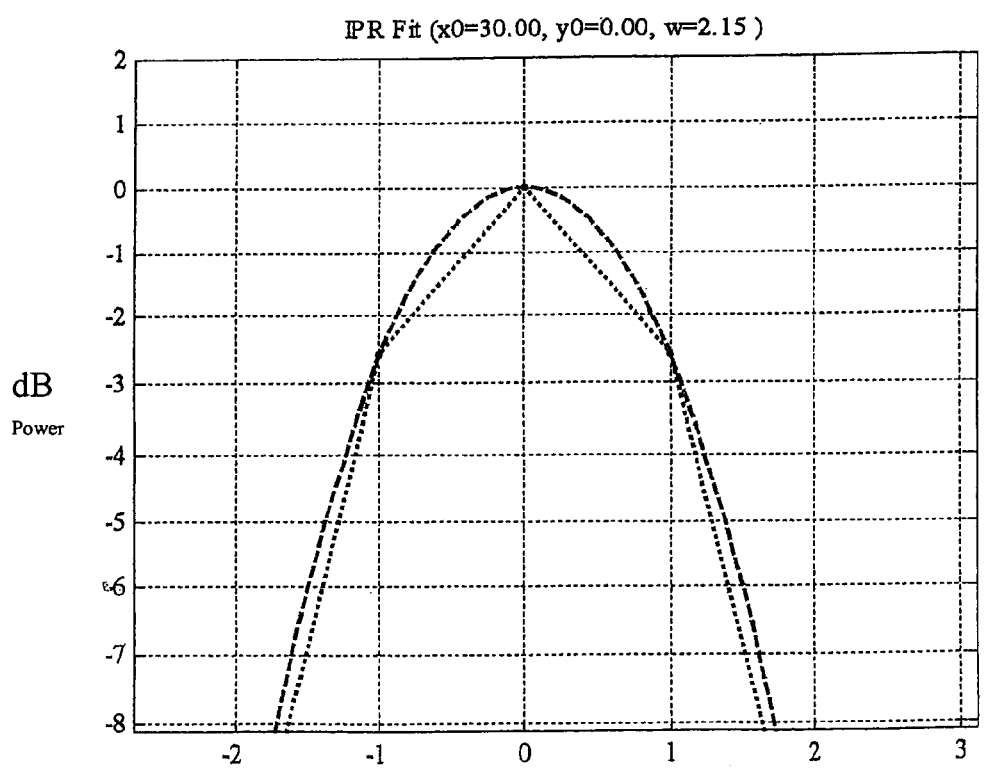
FIG. 11 illustrates a second example of the invention: 2×0 m/s, TA enabled
Figure 12:
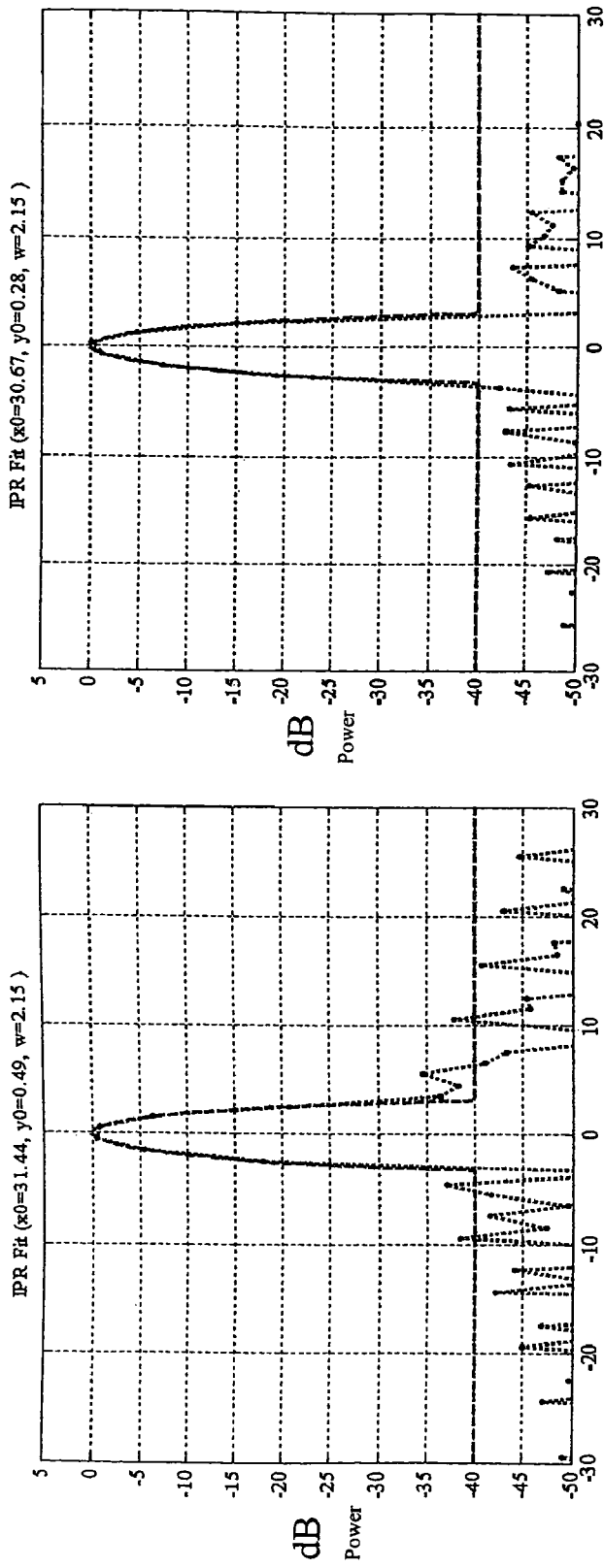
FIG. 12 illustrates a third example of the invention: 3 & 0 m/s, TA disabled
Figure 13:
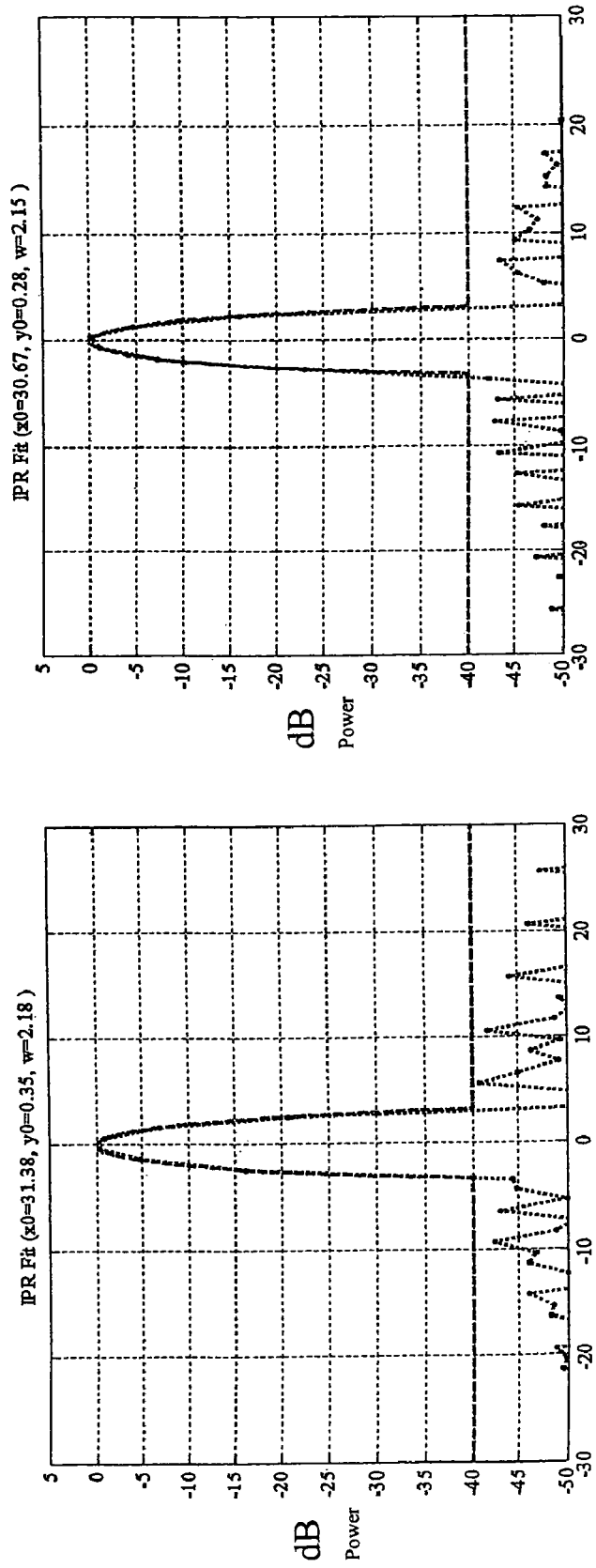
FIG. 13 illustrates a fourth example of the invention: 3 & 0 m/s, TA enabled
Figure 14:
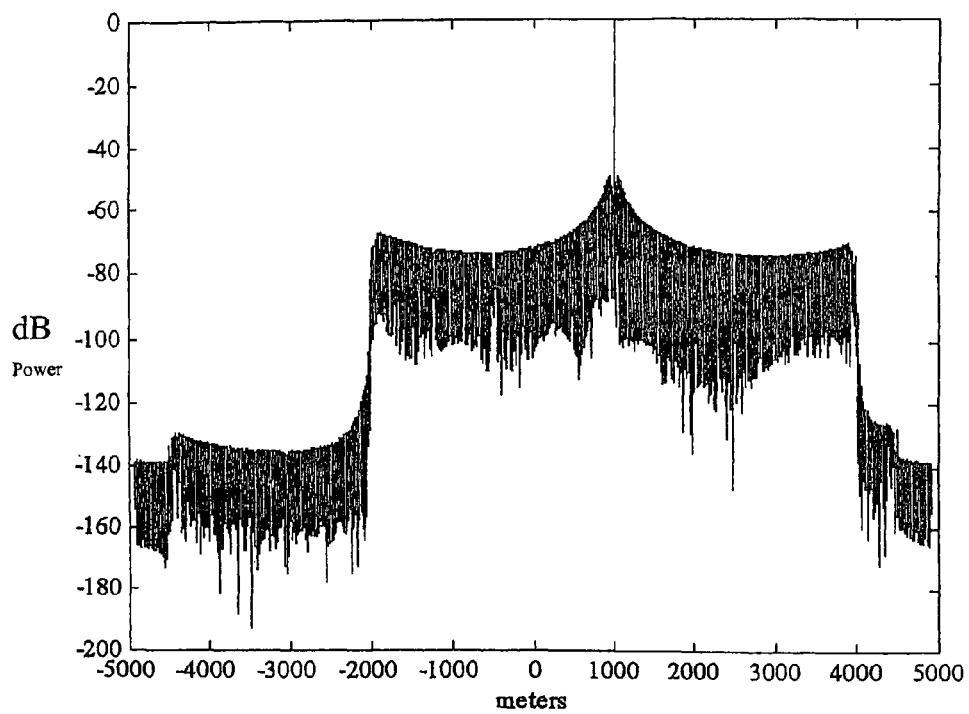
FIG. 14 illustrates a fifth example of the invention: 0 & 0 m/s, TA disabled
Figure 15:
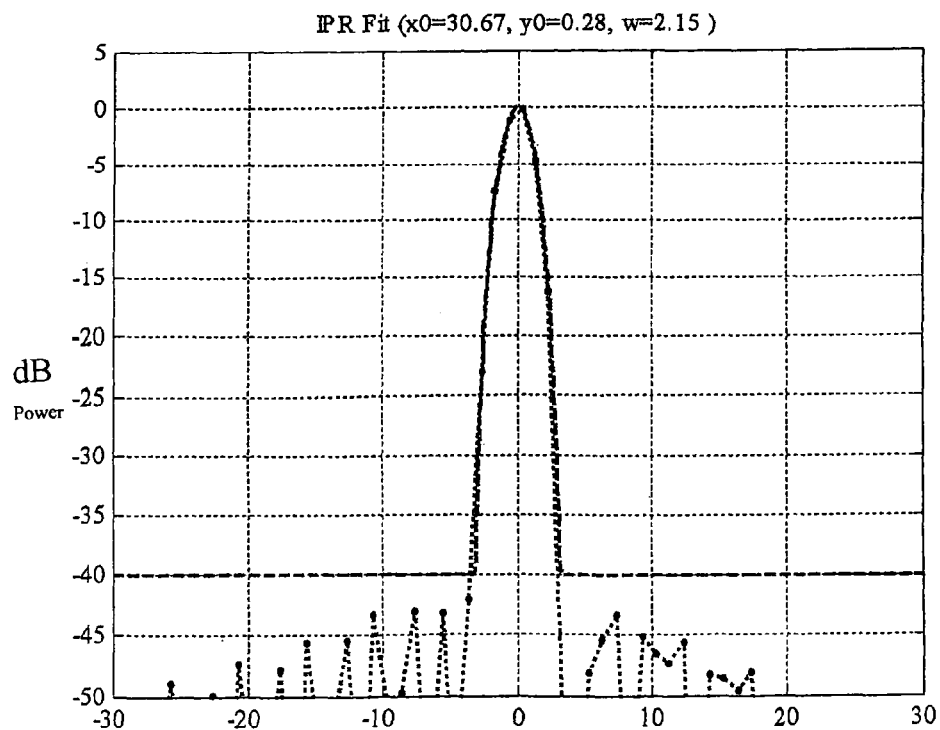
FIG. 15 illustrates a sixth example of the invention: 0 & 0 m/s, TA enabled
Figure 16:
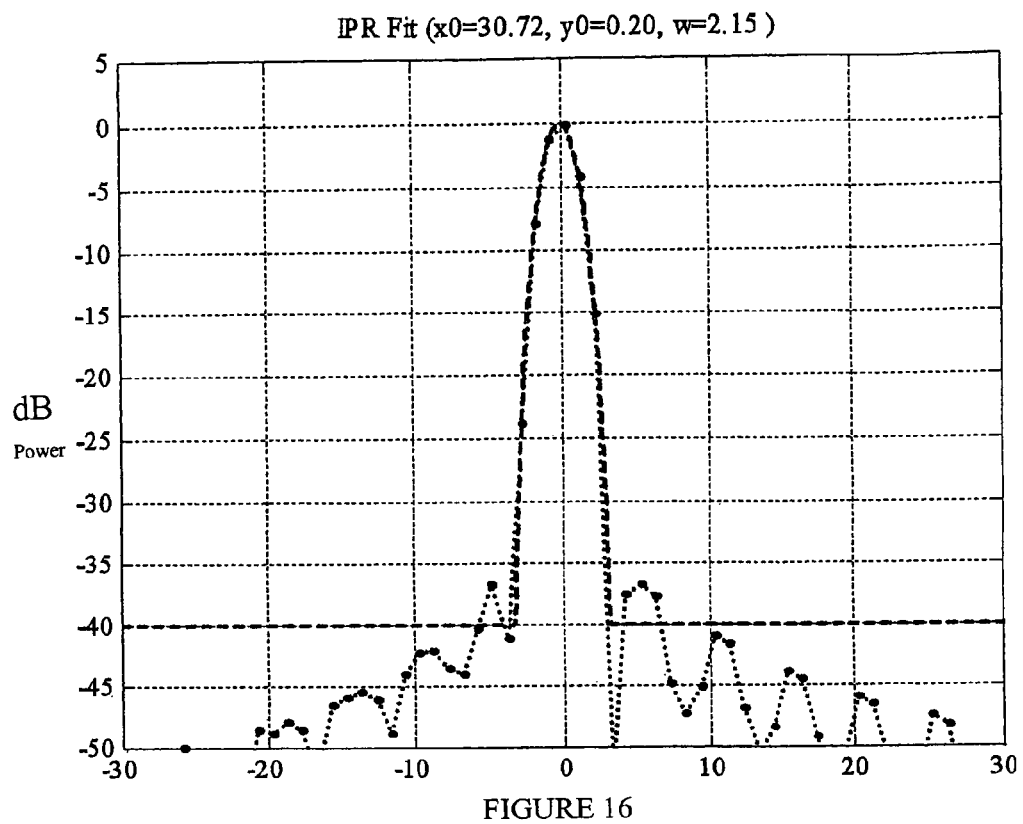
FIG. 16 illustrates a seventh example of the invention: 3 & 0 m/s, TA disabled
Figure 17:
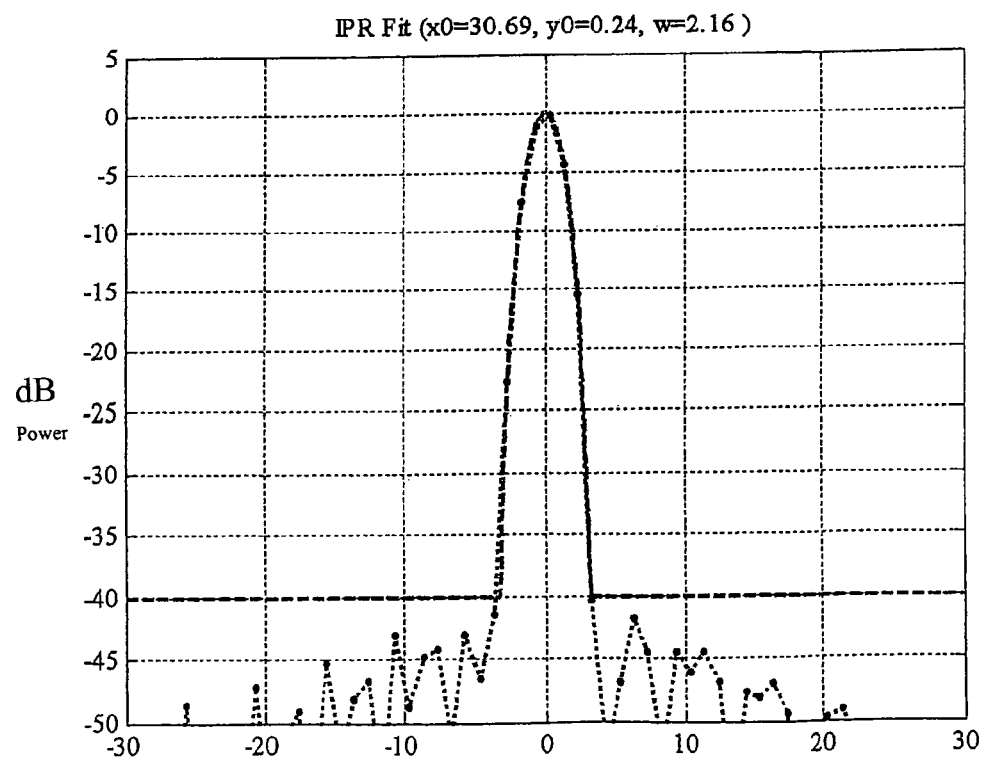
FIG. 17 illustrates an eighth example of the invention: 3 & 0 m/s, TA enabled

With reference to FIG. 9 the graph may be used to estimate resolution and position offset in non-grid centered target responses. The graph also permits estimates of PSLR and ISLR to be made. The graph shows sample indexes with 0.15 m sampling resolution.

FIG. 10-FIG. 17 demonstrate the time alignment improvement for the following:
For targets separated in range
For targets separated at the same range and
For targets at different velocities.
The parameters are shown in Table 1 as follows

| Case/Scenario | Time Alignment | Range (m) Target #1 | Range (m) Target #2 | Range (m/s) Target #1 | Range (m/s) Target #2 |
|---|---|---|---|---|---|
| 1 | Disabled | −1000 | +1000 | 0 | 0 |
| 2 | Enabled | −1000 | +1000 | 0 | 0 |
| 3 | Disabled | −1000 | +1000 | 0 | 3 |
| 4 | Enabled | −1000 | +1000 | 0 | 3 |
| 5 | Disabled | 0 | 0 | 0 | 0 |
| 6 | Enabled | 0 | 0 | 0 | 0 |
| 7 | Disabled | 0 | 0 | 0 | 3 |
| 8 | Enabled | 0 | 0 | 0 | 3 |

CASE/SCENARIO PARAMETERS

Scenario #1: 2 & 0 m/s, TA disabled
   Target at −1 km: 3 dB=0.322 m, PSLR=−41.8 dB, ISLR=−35.6 dB
   Target at −1 km: 3 dB=0.322 m, PSLR=−41.9 dB, ISLR=−35.6 dB
Scenario #2: 2 & 0 m/s, TA enabled
   Target at −1 km: 3 dB=0.322 m, PSLR=−41.8 dB, ISLR=−35.6 dB
   Target at −1 km: 3 dB=0.322 m, PSLR=−41.9 dB, ISLR=−35.6 dB
Scenario #3: 3 & 0 m/s, TA disabled
   Target at −1 km, 3 m/s: 3 dB=0.322 m, PSLR=−34.6 dB, ISLR=−30.7 dB
   Target at −1 km, 0 m/s: 3 dB=0.322 m, PSLR=−42.1 dB, ISLR=−35.7 dB
Scenario #4: 3 & 0 m/s, TA enabled
   Target at −1 km, 3 m/s: 3 dB=0.327 m, PSLR=−40.7 dB, ISLR=−35.0 dB
   Target at −1 km, 0 m/s: 3 dB=0.322 m, PSLR=−42.1 dB, ISLR=−35.7 dB
Scenario #5: 0 & 0 m/s, TA disabled
   Two targets at 1 km: 3 dB=0.322 m, PSLR=−42.0 dB, ISLR=−35.6 dB
Scenario #6: 0 & 0 m/s, TA enabled
   Two targets at 1 km: 3 dB=0.322 m, PSLR-42.0 dB, ISLR=−35.6 dB
Scenario #7: 3 & 0 m/s, TA disabled
   Targets at 1 km, 0 & 3 m/s: 3 dB=0.323 m, PSLR=−36.7 dB, ISLR=−31.0 dB
Scenario #8: 3 & 0 m/s, TA enabled
   Targets at 1 km, 0 & 3 m/s: 3 dB=0.325 m, PSLR=−40.4 dB, ISLR=−34.3 dB

We claim:

1. A high resolution radar signal processing method using narrow processing bandwidths and sampling rates for use in detecting a location and determining a range of a moving target, said method comprising:
   repeatedly broadcasting a series of frequency modulated probe signals using a step frequency radar, said step frequency radar comprising a transmitter and a receiver; each of said series of frequency modulated probe signals comprising three closely spaced linearly frequency modulated chirps, wherein said third chirp is broadcast prior to return of a first one of three corresponding target reflected echo pulses;
   collecting said target reflected echo pulses resulting from said transmitted series of frequency modulated probe signals using said receiver;
   measuring pulse magnitude and phase information using said receiver;
   storing said measured data in a memory;
   time aligning neighboring target reflected echo pulses of each series;
   applying a phase ramp to said neighboring target reflected echo pulses of each series using a fast Fourier transform;
   match filtering by applying individually, to each of said first, second, and third echo pulses, a conjugate of an idealized 205 MHz chirp;
   blending said first, second, and third match filtered echo pulse of each series together with a 5 MHz overlap, and with concatenation of said overlap and linear weighting to produce a coherent sum;
   applying an inverse fast Fourier transform for range compression; and
   using a Hamming window for side lobe reduction, to produce an effective wide bandwidth return signal for improved resolution.

2. A high resolution radar signal processing method according to claim 1 wherein said closely spaced linear frequency modulated chirps have a spacing therebetween of approximately 75 microseconds or less.

3. A high resolution radar signal processing method according to claim 2 wherein said conjugate of an idealized 205 MHz chirp has a pulse bandwidth of 20 microseconds.

4. A high resolution radar signal processing method according to claim 3 wherein said hamming window is 31% wider than a cardinal sine.

5. A high resolution radar signal processing method according to claim 4 wherein said system is capable of providing 0.25 meter resolution of two targets at a distance of one thousand meters.

6. A method of detecting a moving target using a high resolution radar signal, said method comprising:
selectively broadcasting a series of frequency modulated probe signals using a transmitter; each of said series of frequency modulated probe signals comprising at least three linear frequency modulated chirps, wherein said third chirp in each series is broadcast prior to return of a first one of three target reflected echo pulses;
collecting said target reflected echo pulses resulting from said transmitted series of frequency modulated probe signals by using a receiver;
measuring pulse magnitude and phase information using said receiver;
storing said measured data in a memory;
time aligning neighboring target reflected echo pulses of each series, said time alignment comprising alignment based on linear interpolation;
applying a phase ramp to said neighboring target reflected echo pulses of each series using a fast Fourier transform;
match filtering by applying individually, to each of said first, second, and third echo pulses, a conjugate of an idealized 205 MHz chirp;
blending said first, second, and third match filtered echo pulses of each series together with a 5 MHz overlap, and with concatenation of said overlap and linear weighting to produce a coherent sum; and
applying an inverse fast Fourier transform for range compression, to produce an effective wide bandwidth return signal for improved target resolution.

7. A method of detecting a moving target according to claim 6 wherein said linear frequency modulated chirps are of short duration and close spacing.

8. A method of detecting a moving target according to claim 7 wherein said closely spaced linear frequency modulated chirps have a spacing therebetween of approximately 75 microseconds or less.

9. A method of detecting a moving target according to claim 8 wherein said conjugate of an idealized 205 MHz chirp has a pulse bandwidth of 20 microseconds.

10. A method of detecting a moving target according to claim 9 wherein a hamming window is used to reduce side lobes.

11. A method of detecting a moving target according to claim 10 wherein said hamming window is 31% wider than a cardinal sine.

12. A method of detecting a moving target according to claim 11 wherein said system is capable of providing 0.25 meter resolution of two targets at a distance of one thousand meters.

13. A method of detecting a moving target using a high resolution radar, said method comprising:
broadcasting a series of frequency modulated signals using a transmitter; each of said series of frequency modulated signals comprising at least three linear frequency modulated chirps, wherein said third chirp in each series is broadcast prior to return of a first one of at least three corresponding target reflected echo pulses;
collecting target reflected echo pulses resulting from said transmitted series of frequency modulated signals using a receiver;
measuring pulse magnitude and phase information using said receiver;
storing said measured data in a memory;
time aligning neighboring target reflected echo pulses of each series, said time alignment comprising alignment based on a pulse time center frequency determined by linear interpolation of said linear frequency modulated chirps;
applying a phase ramp to said neighboring target reflected echo pulses of each series using a fast Fourier transform;
match filtering by applying individually, to each of said first, second, and third echo pulses, a conjugate of an idealized 205 MHz chirp;
blending said first, second, and third match filtered echo pulses of each series together with a 5 MHz overlap, and with concatenation of said overlap and linear weighting to produce a coherent sum;
applying an inverse fast Fourier transform for range compression; and
using a Hamming window for side lobe reduction, to produce an effective wide bandwidth return signal for improved resolution.

14. A method of detecting a moving target according to claim 13 wherein said closely spaced linear frequency modulated chirps have a spacing therebetween of approximately 75 microseconds or less.

15. A method of detecting a moving target according to claim 14 wherein said conjugate of an idealized 205 MHz chirp has a pulse bandwidth of 20 microseconds.

16. A method of detecting a moving target according to claim 15 wherein said hamming window is 31% wider than a cardinal sine.

17. A method of detecting a moving target according to claim 16 wherein said system is capable of providing 0.25 meter resolution of two targets at a distance of one thousand meters.

* * * * *